Feb. 2, 1937.  L. D. SOUBIER  2,069,542
FURNACE
Filed Feb. 23, 1935  3 Sheets-Sheet 2
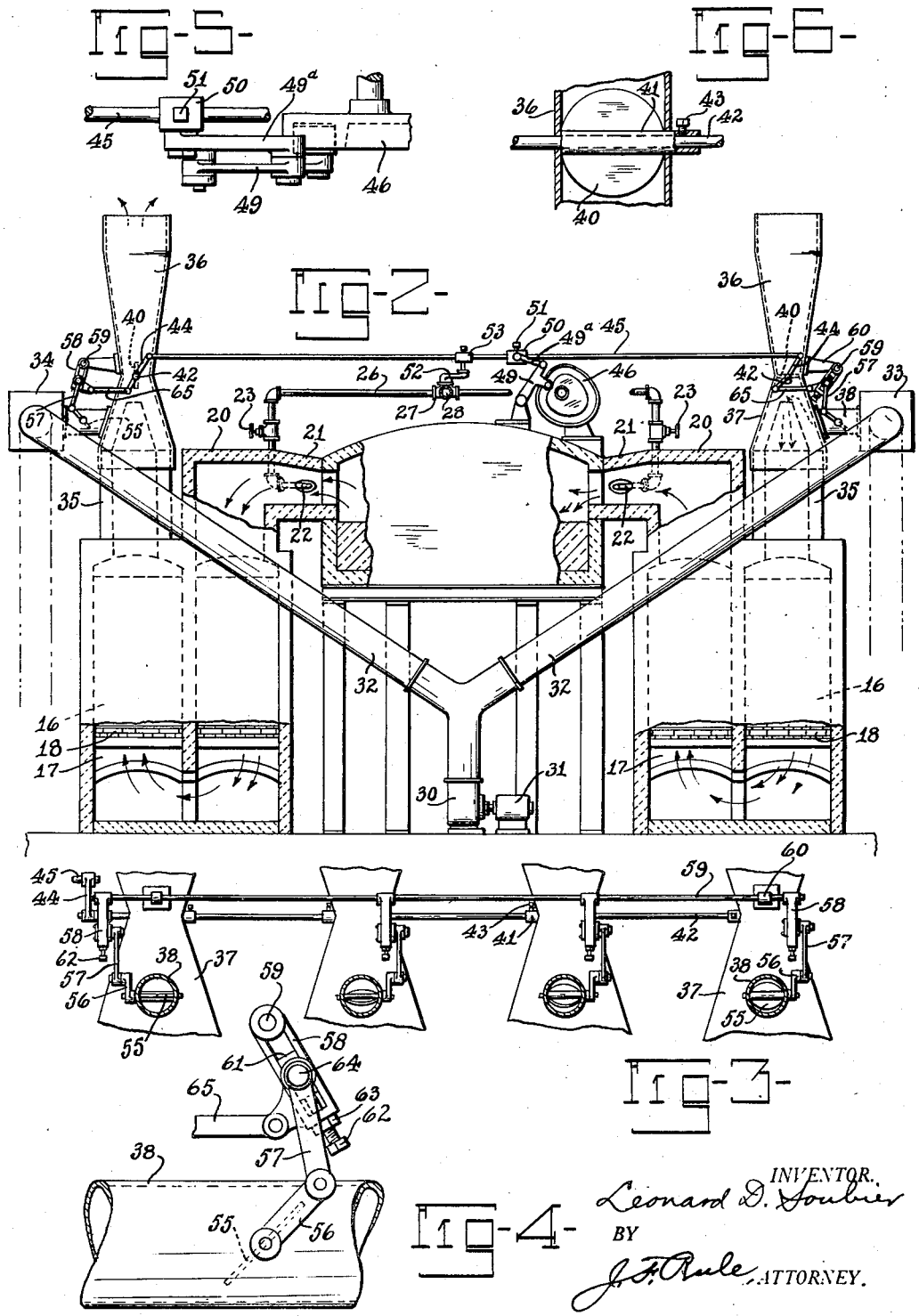

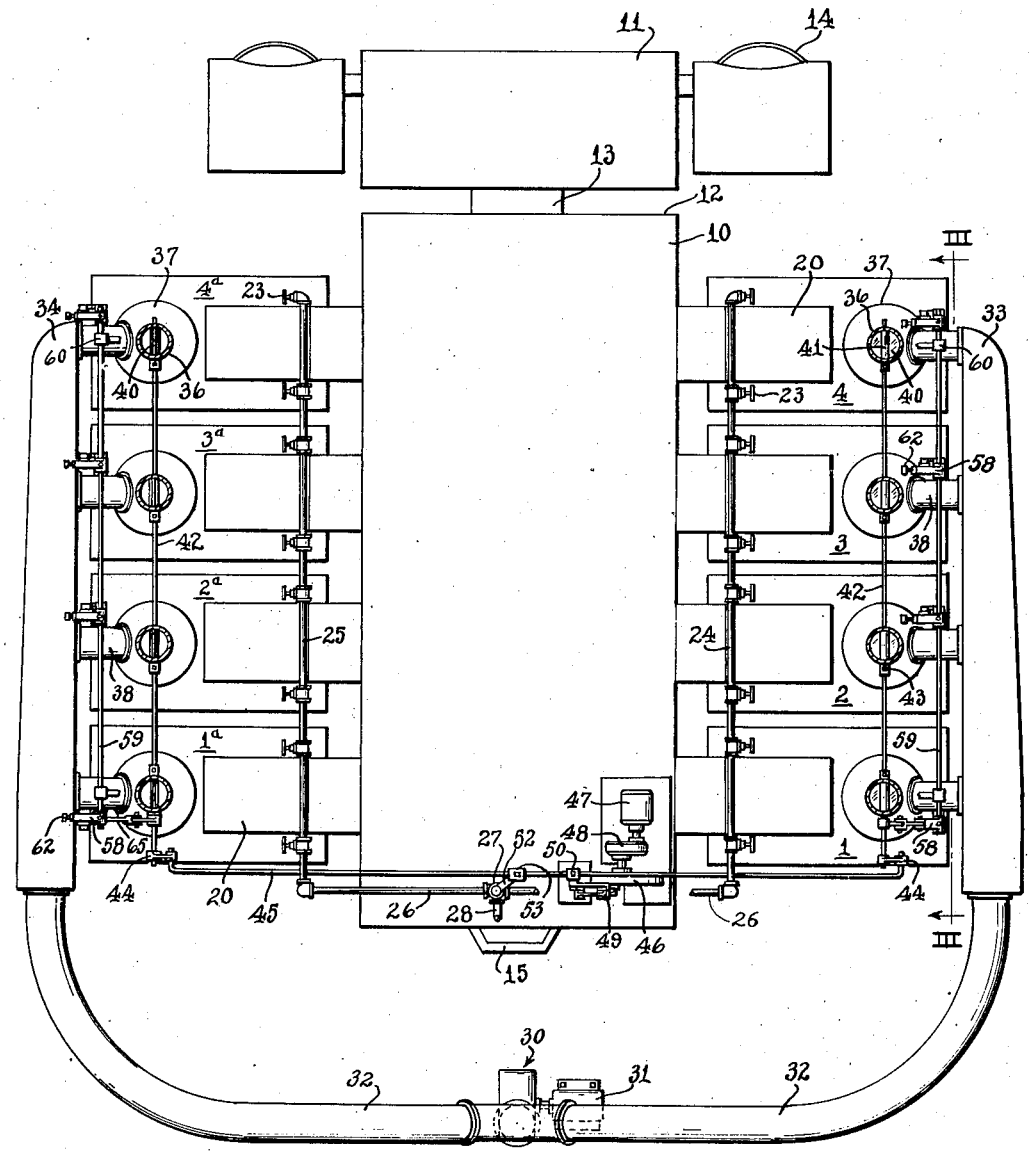

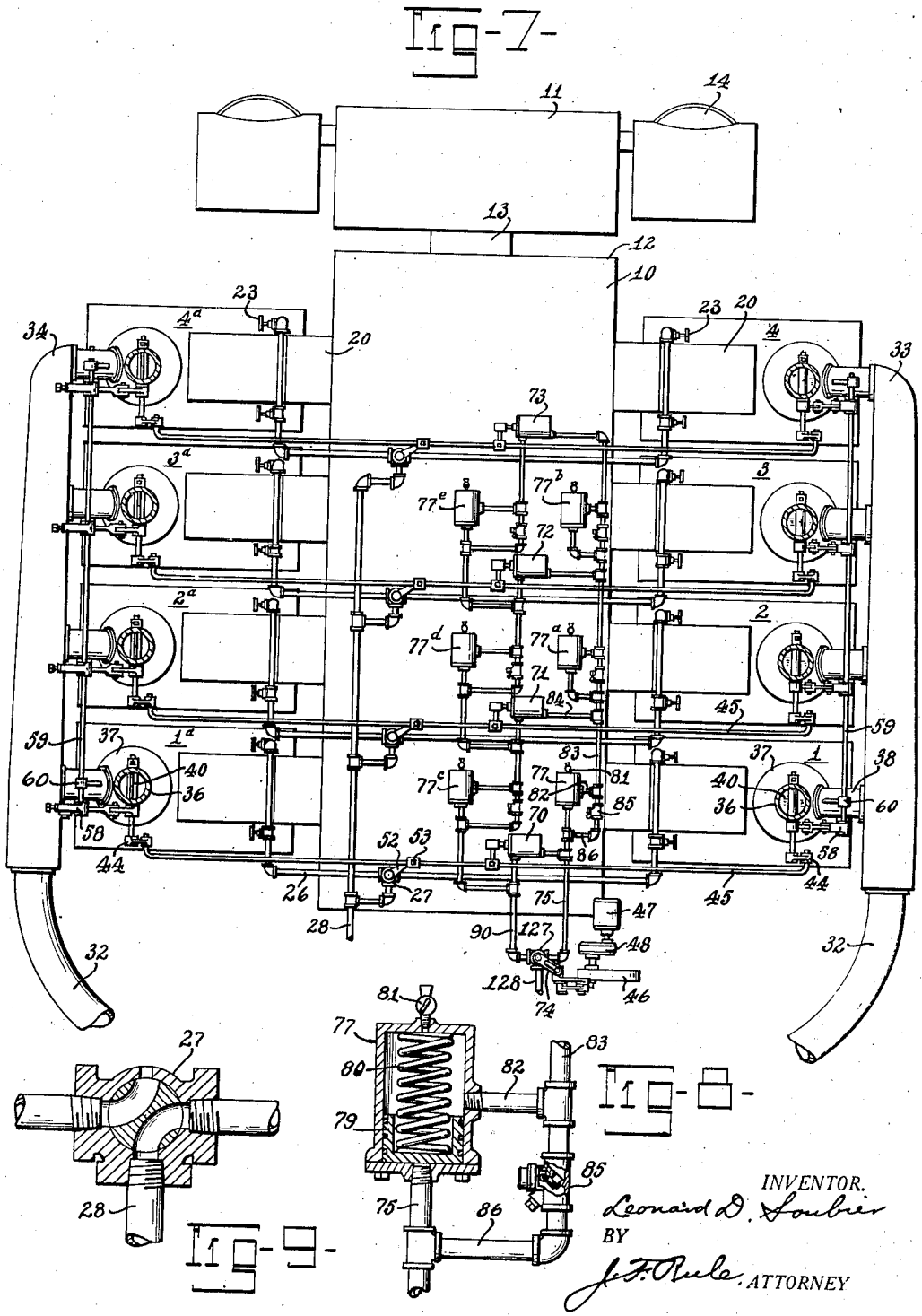

Patented Feb. 2, 1937

2,069,542

UNITED STATES PATENT OFFICE 2,069,542

FURNACE

Leonard D. Soubier, Toledo, Ohio, assignor to Owens-Illinois Glass Company, a corporation of Ohio Application February 23, 1935, Serial No. 7,827

6 Claims. (Cl. 263—15)

My invention relates to tank furnaces and to means for adjustably regulating and controlling the application of heat to the materials being treated. More particularly, the invention in its preferred form, relates to a type of tank furnace in general use for melting and refining glass, comprising a series of regenerators located on each side of the furnace tank and burners associated with and individual to the regenerators. The invention provides a novel system or means for adjustably regulating and controlling the air and fuel supply to the burners and the circulation through each regenerator or pair of regenerators individually, in combination with means for automatically controlling and reversing the circulation through the regenerators as a group.

In furnaces of the type indicated, the batch of raw materials generally in powdered form is ordinarily supplied to the melting tank at one end thereof, the materials gradually moving forward through the tank as they are melted and refined. The flames and hot gases of combustion are directed across the melting tank over the surface of the batch so that the glass during the melting and refining process, is brought successively under the direct influence of the burning gases passing between each pair of regenerators. It is found in practice that the force of the flames carries a certain amount of the powdered ingredients of the batch into the regenerators. This material settles in the checkerwork of the regenerators and more or less restricts the flow of air and gases therethrough. This action is most pronounced in the regenerators nearest the end of the furnace into which the raw batch is fed and decreases gradually toward the opposite end of the furnace. This clogging of the checkerwork decreases the air supply to the burners and reduces their effectiveness so that the field of most efficient combustion moves forward toward the refining end of the tank. As a result, there is an uneven distribution of the heat over the surface area of the melting materials with a consequent reduced efficiency, and as the area of efficient combustion is gradually advanced and limited to the refining end of the tank, the melting and refining becomes incomplete and irregular.

An object of the present invention is to overcome this difficulty and provide means by which a regulated and efficient distribution of the flames or gases of combustion may be maintained over the entire melting area. For this purpose the invention provides valves individual to the burners associated with the several regenerators, and means for individually adjusting the valves, in combination with means for periodically reversing the valves for the usual purpose of reversing the direction of circulation in the burner system.

A further object of the invention is to provide improved means for reversing the direction of circulation through the regenerators, such means comprising automatic mechanism by which the reversal takes place in the several pairs of regenerators in succession and at predetermined time intervals between the reversals of each two succeeding pair of regenerators, means being provided for individually adjusting such time intervals.

An unsatisfactory condition which is encountered in furnaces at present in use, of the general type indicated, relates to the inequality in volume and distribution of heat supplied from the burners on one side of the furnace as compared with the supply from the opposite burners when the circulation is reversed. It is found that usually the volume and intensity of the flames from the burners on opposite sides of the furnace are not equal. As a result, the temperature curve in a direction lengthwise of the melting tank, changes with the reversal of the circulation. This is due in a large measure to unequal expansion and contraction of the checkerwork caused by the heat of the furnace and circulating gases. This produces cracks or openings and introduces more or less air leakage at various points which it is impractical or impossible to control.

An object of the present invention is to overcome this difficulty. This object is attained by the provision of means for individually adjusting the valves which control the air supply to the individual burners so that each valve may be adjusted to counterbalance any air supply due to the air leakage above mentioned, whereby the total supply of air to each burner may be adjustably controlled. In this manner, corresponding burners on opposite sides of the furnace may be so adjusted as to provide a balanced condition of flame temperature and volume. As a result the temperature curve due to the action of the burners on one side of the furnace may be made to accurately conform to that due to the opposite burners when the circulating system is reversed. Inequalites due to air leakage in the checkerwork or other parts of the system can thus be fully compensated for in the manner indicated.

Other objects of the invention will appear hereinafter.

Referring to the accompanying drawings:

Fig. 1 is a part sectional plan view of a preferred form of apparatus constructed in accordance with my invention.

Fig. 2 is a part sectional end elevation of the same.

Fig. 3 is a fragmentary sectional elevation at the line III—III on Fig. 1.

Fig. 4 is a detail view showing means for adjusting and operating a valve.

Fig. 5 is a fragmentary plan view showing cam mechanism for automatically reversing the valves.

Fig. 6 is a fragmentary view showing one of the valves.

Fig. 7 is a view similar to Fig. 1, showing a modified construction by which the circulation through the several pairs of regenerators takes place step by step at predetermined time intervals.

Fig. 8 is a sectional detail view showing one of the timers.

Fig. 9 is a sectional detail view of a reversing valve.

The tank furnace herein shown may be of conventional construction adapted for melting and refining glass. It comprises a main melting tank or compartment 10, a refining compartment 11, a bridge wall 12 between said compartments, and a throat 13 through which the melted glass flows from the melting to the refining compartment. The refined glass flows into revolving pots 14. The batch of raw materials is fed into the furnace through a dog house 15 and is gradually melted and refined as it moves forward to and into the refining compartment.

Regenerators 1, 2, 3 and 4 are arranged in series along one side of the melting tank and a corresponding series of regenerators 1ª, 2ª, 3ª and 4ª is provided at the opposite side of the tank. Each said regenerator may be and as herein shown, is made double, comprising an outer compartment 16 and an inner compartment 17, said compartments containing checkerwork 18 of refractory blocks. Each said compartment 17 is provided at its upper end with a mixing chamber 20 having a horizontal throat extension 21 (Fig. 2) opening through a port in the side wall of the melting tank.

Burners 22 project through openings in the walls of the throats 21. The burners are supplied with fuel gas through manifold pipes 24 and 25 on opposite sides of the furnace. Valves 23 individual to the burners, are provided for adjustably regulating or cutting off the supply of fuel gas to the burners. The pipes 24 and 25 are connected to end pipes 26 which extend to a reversing valve 27 operated in a manner hereinafter described. The fuel gas is supplied from any suitable source through a supply pipe 28 leading to the reversing valve.

Air for supporting combustion may be supplied to the mixing chambers under forced draft provided by a blower 30 driven by a motor 31. The air is conducted through branch pipes 32 to manifolds or headers 33 and 34 which are arranged at opposite sides of the furnace. Each of the regenerator compartments 16 is provided with a stack 35 over which is positioned an auxiliary stack 36, the lower portion of which is formed with a hood extension 37 fitting over the upper end of the stack 35. Branch pipes 38 which extend from the headers 33 and 34 to the hoods 37, provide ports opening from the headers to the hoods and to the stacks 35.

Each stack 36 has mounted therein a valve or damper 40 (Figs. 2 and 6). Each said valve, as shown in Fig. 6, is provided with a hub or sleeve 41 adjustably mounted on a valve rod 42 and held in adjusted position by a set screw 43. It will be noted that there is a rod 42 on each side of the furnace, each rod carrying the valves 40 on the same side of the furnace. Each said valve 40 may be rotatively adjusted independently of the others by loosening the corresponding set screw 43 and adjustably rotating the sleeve 41 carrying the valve. Each of the rods 42 has attached to its forward end a rock arm 44, said rock arms being connected by a reversing rod 45 extending across the front end of the furnace.

The rod is periodically shifted in the direction of its length by means of a cam 46 (Figs. 1, 2 and 5) actuated by an electric motor 47 having a driving connection with the cam through a speed reducing mechanism 48. An automatic control device (not shown) causes periodic operation of the motor 47. The cam operates a rock arm 49 connected through a link 49ª to a block 50 mounted on the rod 45. The block 50 is adjustable lengthwise of the rod 45 and held in adjusted position by a set screw 51. Adjustment of the block 50 causes simultaneous adjustment of all the valves 40. The reversing valve 27 has an operating connection with the rod 45 by means of a rock arm 52 connected at one end to the valve and at its opposite end to a block 53 mounted on and adjustable lengthwise of the rod 45.

Each of the branch pipes 38 has mounted therein a valve 55 (see Figs. 3 and 4), the construction and mounting of which may be substantially the same as disclosed in connection with the valves 40 (Fig. 6), permitting individual adjustment of the valves 55, if desired. Each valve 55 is connected through a rock arm 56 and link 57 to a rock arm 58. The rock arms 58 are mounted on a rock shaft 59 which is journaled in bracket arms 60 attached to the stacks 36.

By reference to Fig. 4, it will be seen that an adjustable connection is provided between the link 57 and rock arm 58. Such connection includes an adjustable block 61 movable lengthwise in a slot formed in the arm 58, said block carrying an adjusting screw 62 having a threaded connection with the arm 58 by which the block may be adjusted along the arm. The block is held in adjusted position by a lock nut 63. The link 57 is connected to the block 61 by a pivot pin 64. An operating connection is provided between each of the rods 42 and one of the adjacent arms 58 by a link 65 extending between said arm 58 and a rock arm on the shaft 42. It will be seen that movement of the reversing rod 45 is transmitted through the connections just described, to the arm 58 and from said arm to the valves 55.

The operation of the form of apparatus shown in Figs. 1 to 6 may be described as follows:

With the parts in the position shown, the reversing valve 27 is open to the pipe line 26, 24 on the right-hand side of the furnace so that fuel gas is supplied to the burners 22 on the right of the furnace. The blower 30 supplies air for supporting combustion through the right-hand header 33 and branch pipes 38 to the stacks 35. The circulation of air is downward through the compartments 16 and upward through the compartments 17 of the right-hand regenerators 1, 2, 3 and 4 to the mixing chambers 20. This air is mixed with the fuel gas from the burners so that combustion takes place in the furnace, the flames being directed across the melting tank. The spent gases of combustion circulate as indicated by the arrows, through the left hand regenerators and upward through the stacks 35 and 36. The valves 40 in the right-hand stacks 36 are at this time in closed position while the valves 40 in the left-hand stacks are open, so that the spent gases are drawn upward and escape through the stacks 36. The valves 55 are so adjusted that the proper amount of air for combustion is supplied to each of the burners 22. If, as before explained, the checkers in the regenerators nearest the dog house have been clogged to some extent with the dust or powdered materials forming the batch, the corresponding valves 55 are adjusted to a comparatively wide open position. This tends to increase the air supply and the force of the flames and gases of combustion, and thereby counteracts or overcomes the resistance due to the clogging of the regenerators. By individual adjustment of the valves 55 in this manner, a uniform distribution of the burning gases may be obtained or, if desired, the intensity of the flames may be increased over any predetermined areas of the glass in the furnace. In Fig. 3, I have shown a graduated adjustment of the burners 55 to counteract the progressively decreasing resistance in the regenerators from the receiving end to the discharging end of the melting tank.

When the parts have remained for a predetermined period in the position shown, the motor 37 operates automatically to rotate the cam 46 and thereby shift the reversing rod 45 to the left. This reverses the valve 27 so that fuel gas is cut off from the right hand side and supplied to the left hand manifold 25 and burners supplied thereby. The reversing rod 45 at the same operation closes the valves 40 at the left-hand side of the tank and opens the right-hand valves 40. Said rod also operates through the links 65 to reverse the port valves 55 in the branch pipes 38. This reversal of parts reverses the direction of circulation of the air and fuel gases. The periodic reversal serves the usual purpose of utilizing the heat from the spent gases of combustion for periodically heating the regenerators on one side of the furnace while the others are supplying heat to the air which supports combustion.

Fig. 7 shows a modified construction by which the reversal of the circulation takes place in the several pairs of regenerators in succession, the reversal taking place progressively from the receiving end to the refining end of the tank. As here shown, reversing rods 45 are provided individual to the pairs of regenerators. These rods are operated by a series of air motors 70, 71, 72 and 73 which are individual to said rods. The cam 46 operates through mechanism 74 to periodically reverse a valve 127.

Assuming the parts to be in the position shown, the valve 127 when reversed, admits air under pressure from a pipe 128 through the valve to a line 75 leading to the right-hand end of the motor 70, so that the latter operates to move the first reversing rod 45 to the left, thereby reversing the valves 40 for the first pair of regenerators 1, 1ª. The reversing rod at the same time, reverses the gas valve 27, admitting gas to the first set of burners. When air under pressure is admitted to the motor 70 it is also admitted to the lower end of a timer or retarding device 77. The timer (see Fig. 8) includes a piston 79 normally held in the lower end of a timer cylinder by a spring 80. A petcock 81 adjustably controls a bleed opening in the upper end of the timer. Air pressure admitted to the lower end of the timer in the manner above mentioned, moves the piston 79 upward at a rate determined by the adjustment of the petcock 81. As the piston nears the upper end of the cylinder, it opens to the air pressure a by-pass pipe 82 connecting the timer with a pipe line 83. Air under pressure is transmitted through pipes 83 and 84 to the air motor 71, causing the latter to operate the reversing rod 45 controlling the fuel and air valves of the second pair of regenerators 2, 2ª. Timers 77ª and 77ᵇ operate in the same manner as the timer 77 to admit air under pressure to the air motors 72 and 73 in succession, thereby causing the motors to operate the reversing mechanism step-by-step. Associated with each timer is a check valve 85 (Fig. 8) which controls a by-pass 86, said check valves opening only in a downward direction.

When the valve 127 is again reversed, the pipe line 83, 75 is opened to exhaust, and air pressure is admitted through a line 90 to the left-hand end of the piston motor 70. The latter is thereby actuated and moves the rod 45 to the right to reverse the valves for the first pair of regenerators. The motors 71, 72 and 73 are also operated in succession under the control of timers 77ᶜ, 77ᵈ and 77ᵉ.

By suitable adjustment of the petcocks 81, the time intervals between the operations of the individual reversing mechanisms, and also the time required for a reversal of the entire circulating system, can be adjustably regulated and controlled as desired. Thus, for example, by leaving all of the petcocks wide open, the operation of the several reversing devices takes place in quick succession. By partly closing the petcocks, the time required for reversing the circulation may be greatly extended.

Although in the particular arrangement shown in Fig. 7, the reversal through the regenerators takes place progressively from the receiving end of the furnace toward the refining end, it will be understood that the reversing mechanisms may be arranged to operate in any desired order, as for example, progressively from the refining end toward the receiving end of the furnace.

Modifications may be resorted to within the spirit and scope of my invention.

I claim:

1. The combination of a furnace tank, burners arranged at intervals therealong, devices individual to said burners for bringing them into activity, automatic means for actuating said devices successively and at predetermined time intervals, and adjusting devices individual to the burners for adjustably varying individually the length of said time intervals.

2. The combination of a tank furnace, pairs of regenerators arranged at intervals along the furnace, the regenerators of each pair being positioned on opposite sides of the furnace, burners associated with each regenerator, valves individual to the regenerators and controlling the circulation of air therethrough and to the burners, automatic means for periodically reversing the circulation of air and gases through the regenerators, and automatic means by which the reversal of the circulation is caused to take place in the several pairs of regenerators in succession with a predetermined time interval between the reversals in each two succeeding pairs of regenerators.

3. The combination of a tank furnace, pairs of regenerators arranged at intervals along the furnace, the regenerators of each pair being positioned on opposite sides of the furnace, burners associated with each regenerator, valves individual to the regenerators and controlling the circulation of air therethrough and to the burners, automatic means for periodically reversing the circulation of air and gases thru the regenerators, automatic means by which the reversal of the circulation is caused to take place in the several pairs of regenerators in succession with a predetermined time interval between the reversals in each two succeeding pairs of regenerators, and adjusting devices by which said time intervals may be individually adjusted.

4. The combination of a tank furnace, pairs of regenerators positioned at intervals along the furnace with the regenerators of each pair positioned on opposite sides of the furnace, burners associated with said regenerators, means for causing a circulation of air and gases of combustion thru the regenerators, valves individual to the regenerators, reversing devices individual to the pairs of regenerators and operative to reverse said valves, each said reversing device including an air motor, an air line connecting said motors, and timer devices in said air line, said timer devices being operable to admit air under pressure to each motor at a predetermined time interval after air pressure is admitted to the preceding motor, whereby the reversing devices are operated in succession at predetermined time intervals.

5. The combination of a tank furnace, pairs of regenerators positioned at intervals along the furnace with the regenerators of each pair positioned on opposite sides of the furnace, burners associated with said regenerators, means for causing a circulation of air and gases of combustion thru the regenerators, valves individual to the regenerators, reversing devices individual to the pairs of regenerators and operative to reverse said valves, each said reversing device including an air motor, an air line connecting said motors, and timer devices in said air line, said timer devices being operable to admit air under pressure to each motor at a predetermined time interval after air pressure is admitted to the preceding motor, whereby the reversing devices are operated in succession at predetermined time intervals, and adjusting means associated with said timer devices for adjustably varying said time intervals.

6. The combination with a furnace tank, of burners arranged at intervals along one side of the tank and corresponding burners arranged along the opposite side of the tank, automatic means for reversing corresponding burners in succession, and means for adjustably varying the time intervals between the reversing of each two succeeding corresponding burners.

LEONARD D. SOUBIER.